(12) United States Patent
Duesterwald et al.

(10) Patent No.: US 12,079,648 B2
(45) Date of Patent: Sep. 3, 2024

(54) FRAMEWORK OF PROACTIVE AND/OR REACTIVE STRATEGIES FOR IMPROVING LABELING CONSISTENCY AND EFFICIENCY

(71) Applicant: International Business Machines Corporation, Armonk, NY (US)

(72) Inventors: Evelyn Duesterwald, Millwood, NY (US); Austin Zachary Henley, Memphis, TN (US); David John Piorkowski, White Plains, NY (US); John T. Richards, Honeoye Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1453 days.

(21) Appl. No.: 15/857,599

(22) Filed: Dec. 28, 2017

(65) Prior Publication Data

US 2019/0205703 A1    Jul. 4, 2019

(51) Int. Cl.
*G06F 9/451*    (2018.01)
*G06F 17/18*    (2006.01)
(Continued)

(52) U.S. Cl.
CPC .............. *G06F 9/453* (2018.02); *G06F 17/18* (2013.01); *G06F 18/24* (2023.01); *G06F 18/41* (2023.01);
(Continued)

(58) Field of Classification Search
CPC .. G06K 9/6267; G06K 9/6254; G06K 9/6253; G06K 9/6263; G06K 9/6268;
(Continued)

(56) References Cited

U.S. PATENT DOCUMENTS 6,064,381 A * 5/2000 Harel ...................... G06F 9/453
                                                                            715/705
7,280,965 B1 * 10/2007 Begeja .................... G10L 13/08
                                                                            704/257

(Continued)

OTHER PUBLICATIONS

Petrillo, M. et al.; "Introduction to Manual Annotation"; Fairview Research; Apr. 2010.

(Continued)

*Primary Examiner* — Matthew Ell
*Assistant Examiner* — Alvaro R Calderon, IV
(74) *Attorney, Agent, or Firm* — Caleb Wilkes; Otterstedt & Kammer PLLC

(57) ABSTRACT

Performance of a computer implementing a machine learning system is improved by providing, via a graphical user interface, to an annotator, unlabeled corpus data to be labeled; obtaining, via the interface, labels for the unlabeled corpus data; and detecting, with a consistency calculation routine, concurrent with the labeling, internal inconsistency and/or external inconsistency in the labeling. Responsive to the detection, intervene in the labeling with a reactive intervention subsystem until the inconsistency is addressed. The labeling is completed subsequent to the intervention; the system is trained to provide a trained machine learning system, based on results of the completed labeling; and classification of new data is carried out with the trained system. Proactive intervention schemes are also provided.

13 Claims, 17 Drawing Sheets

(51) Int. Cl.
  *G06F 18/24* (2023.01)
  *G06F 18/40* (2023.01)
  *G06F 40/169* (2020.01)
  *G06N 20/00* (2019.01)
  *G06F 16/28* (2019.01)

(52) U.S. Cl.
  CPC .......... *G06F 40/169* (2020.01); *G06N 20/00* (2019.01); *G06F 16/285* (2019.01)

(58) Field of Classification Search
  CPC ........ G06F 9/453; G06F 17/18; G06F 40/169; G06F 16/285; G06F 18/24; G06F 18/41; G06F 18/2178; G06F 18/241; G06F 18/40; G06N 20/00
  See application file for complete search history.

(56) References Cited

U.S. PATENT DOCUMENTS

| | | | |
|---|---|---|---|
| 7,904,501 B1* | 3/2011 | Wei | G06F 16/48 715/702 |
| 7,933,774 B1 | 4/2011 | Begeja et al. | |
| 8,170,880 B2 | 5/2012 | Begeja et al. | |
| 9,195,646 B2 | 11/2015 | Tsuchida et al. | |
| 2003/0145281 A1* | 7/2003 | Thames | G06F 8/73 715/205 |
| 2003/0212544 A1* | 11/2003 | Acero | G06F 40/30 704/9 |
| 2004/0111668 A1* | 6/2004 | Cragun | G06F 40/169 715/255 |
| 2005/0108630 A1* | 5/2005 | Wasson | G06F 40/169 707/E17.084 |
| 2005/0160355 A1* | 7/2005 | Cragun | G06F 40/169 715/230 |
| 2006/0048046 A1* | 3/2006 | Joshi | G06F 40/169 715/230 |
| 2006/0107220 A1* | 5/2006 | Letkeman | G06F 40/169 715/230 |
| 2006/0203980 A1* | 9/2006 | Starkie | G06F 8/65 379/88.18 |
| 2007/0016615 A1* | 1/2007 | Mohan | G06F 8/20 |
| 2007/0271503 A1* | 11/2007 | Harmon | G06F 18/41 715/230 |
| 2008/0005064 A1* | 1/2008 | Sarukkai | G06F 16/957 |
| 2010/0023319 A1* | 1/2010 | Bikel | G06F 40/169 704/9 |
| 2010/0138368 A1* | 6/2010 | Stundner | G06N 20/00 706/47 |
| 2010/0217597 A1* | 8/2010 | Begeja | G10L 15/18 704/E15.005 |
| 2012/0030157 A1* | 2/2012 | Tsuchida | G06N 20/00 706/20 |
| 2013/0110498 A1* | 5/2013 | Bekkerman | G06Q 50/01 704/9 |
| 2013/0185657 A1* | 7/2013 | Gunawardena | G06F 16/48 715/753 |
| 2014/0359421 A1* | 12/2014 | Allen | G06F 40/169 715/230 |
| 2015/0370782 A1 | 12/2015 | Fan et al. | |
| 2016/0140106 A1 | 5/2016 | Bekkerman | |
| 2016/0147399 A1* | 5/2016 | Berajawala | H04L 67/10 715/753 |
| 2016/0196249 A1* | 7/2016 | Allen | G06F 40/169 715/230 |
| 2016/0196250 A1* | 7/2016 | Allen | G06F 16/285 715/230 |
| 2016/0253596 A1* | 9/2016 | Goth, III | G09B 7/02 706/12 |
| 2017/0053337 A1* | 2/2017 | Naito | G06Q 10/087 |
| 2017/0316777 A1* | 11/2017 | Perez | G06F 40/35 |
| 2017/0357909 A1* | 12/2017 | Willamowski | G06N 20/00 |
| 2018/0114142 A1* | 4/2018 | Mueller | G06V 30/224 |
| 2018/0373980 A1* | 12/2018 | Huval | G06F 18/41 |
| 2019/0066660 A1* | 2/2019 | Liang | G10L 15/183 |
| 2020/0251091 A1* | 8/2020 | Zhao | G06N 5/022 |

OTHER PUBLICATIONS

Anonymously; "Automated Annotator Creation Based on Comparison of Corpora"; http://ip.com/IPCOM/000236406D; Apr. 24, 2014.
Anonymously; "System and Method for Application-Oriented Hybrid Word Segmentation with Supervised and Unsupervised Data"; http://ip.com/IPCOM/000240823D; Mar. 5, 2015.
Anonymously; "Productive Method for Large Scale Time Aligned Phonetic Annotation of Speech"; http://ip.com/IPCOM/000203058D; Jan. 17, 2011.
Anonymously; "Boilerplate Text Detection in Clinical Documentation"; http://ip.com/IPCOM/000245410D; Mar. 8, 2016.
Drouhard, M. et al., (Apr. 2017). Aeonium: Visual analytics to support collaborative qualitative coding. In Pacific Visualization Symposium (PacificVis), 2017 IEEE. (pp. 220-229). IEEE.
CAT Coding Analysis Toolkit—https://cat.texifter.com/, 2007-2017—CAT is maintained by Texifter, LLC and powered by Microsoft ASP.NET.
Amazon mechanical turk—Mechanical Turk is a marketplace for work. Amazon.com company 2005-2017.
ATLAS.ti 8 the Next Level https://atlasti.com/.
Wikipedia—Computer-assisted qualitative data analysis software, downloaded Nov. 30, 2017, 4 pages.
Wikipedia—Fleiss' kappa, downloaded Dec. 20, 2017, 5 pages.
Indico—text and image analysis powered by machine learning, Machine Learning for Human Use, https://indico.io/product/.
Indico—text and image analysis powered by machine learning. Crowdlabel, https://indico.io/product/.
Wikipedia—Kendall rank correlation coefficient, downloaded Dec. 20, 2017, https://en.wikipedia.org/wiki/Kendall_rank_correlation_coefficient, 6 pages.
Kendall tau metric—Encyclopedia of Mathematics, https://www.encyclopediaofmath.org/index.php/Kendall_tau_metric1/, downloaded Dec. 20, 2017, 3 pages }.
"Nvivo: The #1 Software for Qualitative Data Analysis", https://www.qsrinternational.com/nvivo/home, 4 pages.
Wikipedia—Pearson correlation coefficient, downloaded Dec. 20, 2017, https://en.wikipedia.org/wiki/Pearson_correlation_coefficient, 17 pages.
Wikipedia—Scott's Pi, downloaded Dec. 20, 2017, https://en.wikipedia.org/wiki/Scott%27s_Pi, 2 pages.
Wikipedia—Spearman's rank correlation coefficient, downloaded Dec. 20, 2017, https://en.wikipedia.org/wiki/Spearman%27s_rank_correlation_coefficient, 7 pages.
Training data, machine learning and human-in-the-loop for AI in a single platform _ CrowdFlower, https://www.figure-eight.com/, 3 pages.

* cited by examiner

FIG. 5

Inter-rater Reliability [v Show]

[ Jaccard's Index ] Cohen's Kappa   Fleiss' Kappa   the Pi statistic   Pearson's r   Kendall's Tau coefficient   Spearman's rho Jaccard's Index is a measure of agreement between two or more coders. It is calculated by dividing codes that coders agree on (intersection) by the total number of codes (union). A good rule of thumb for Jaccard's index is greater than or equal to 80%.

David P. and John:
Grice's Maxims → Relevance 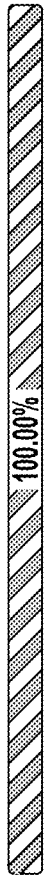 100.00%

David P. and Michal:
Grice's Maxims → Relevance 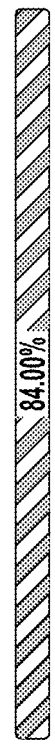 84.00%

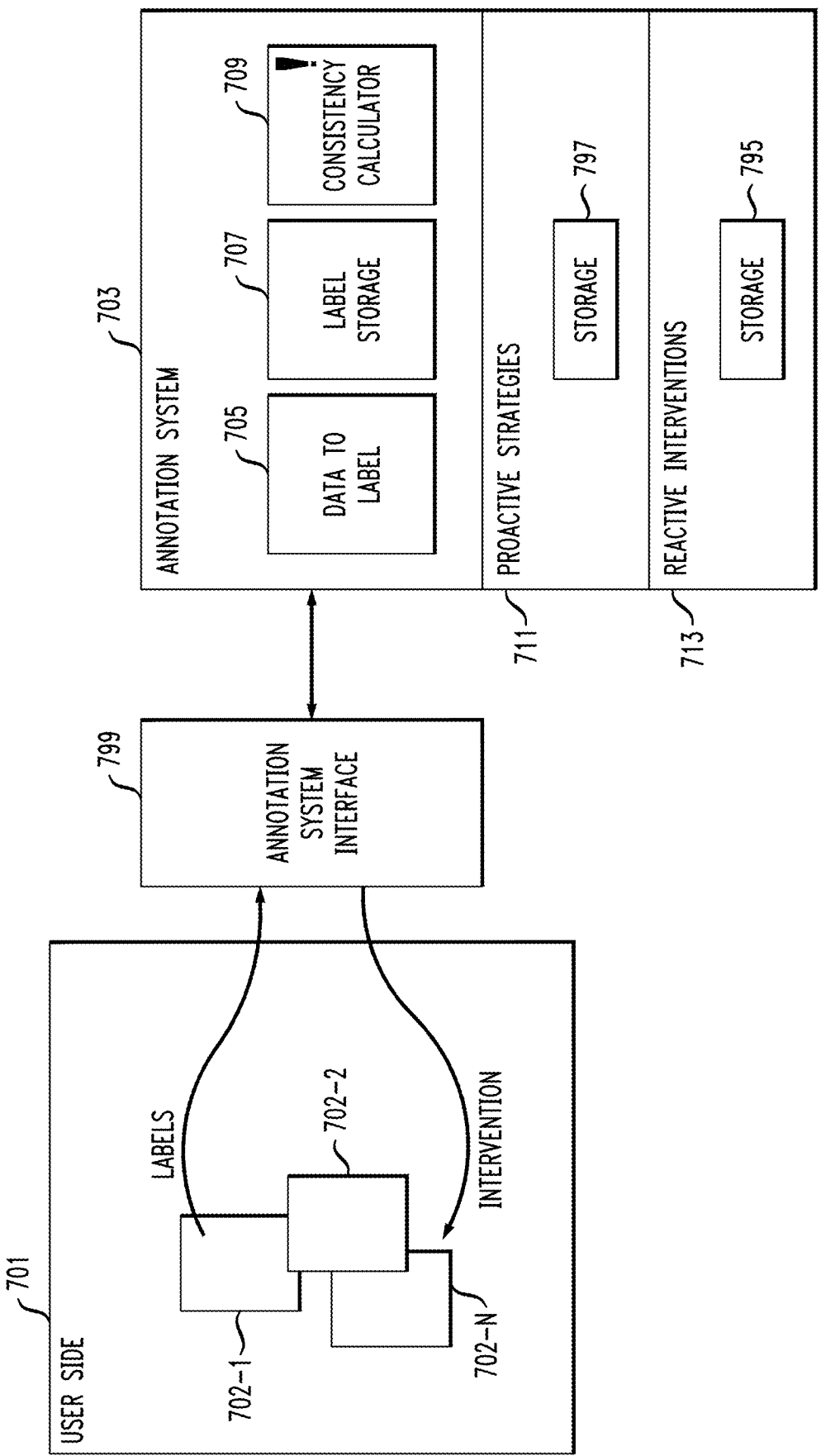

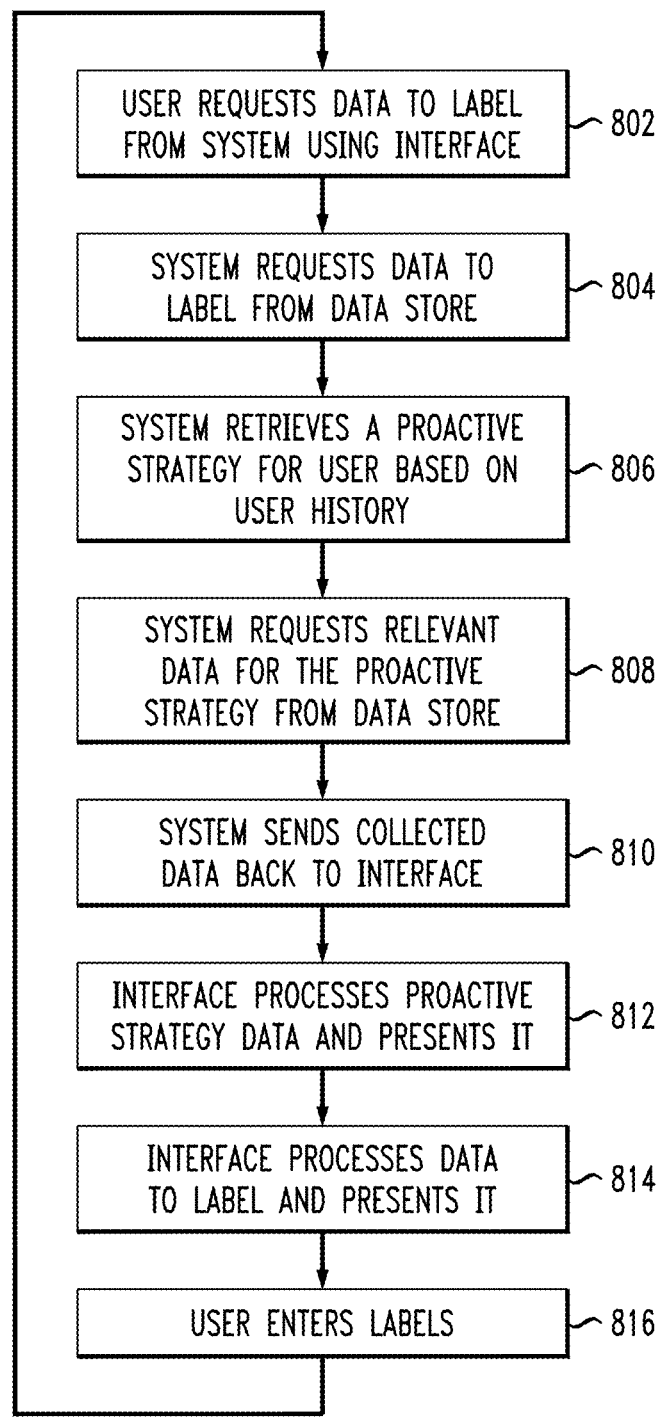

FIG. 11

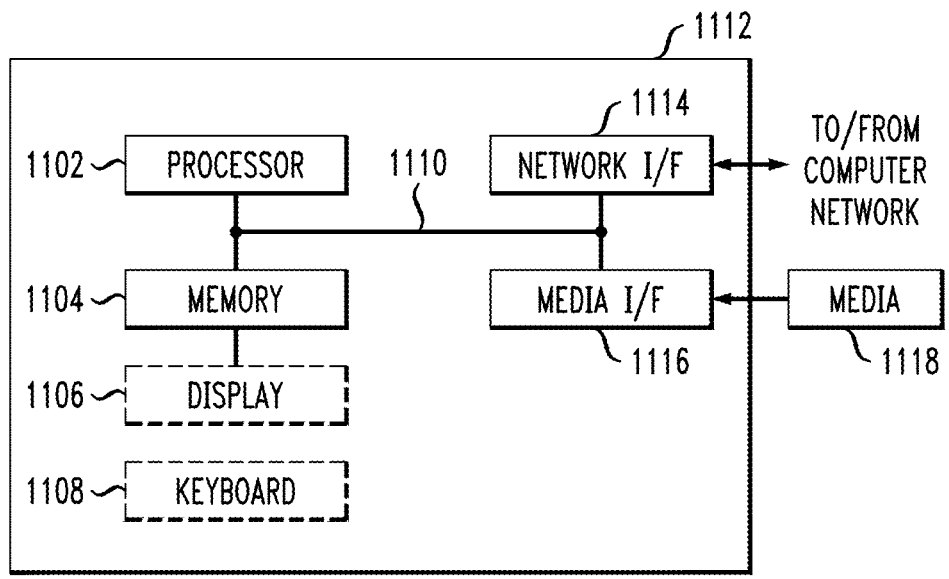

FIG. 12

| | | |
|---|---|---|
| FLEISS' KAPPA: | $\kappa = \dfrac{\bar{P} - \bar{P}_e}{1 - \bar{P}_e}$ | |
| PI STATISTIC: | $\pi = \dfrac{\Pr(a) - \Pr(e)}{1 - \Pr(e)}$ | |
| PEARSON'S r: | $\rho_{X,Y} = \dfrac{E[(X - \mu_X)(Y - \mu_Y)]}{\sigma_X \sigma_Y}$ | |
| KENDALL'S TAU COEFFICIENT: | $\tau = \dfrac{(\text{number of concordant pairs}) - (\text{number of discordant pairs})}{n(n-1)/2}$ | |
| SPEARMAN'S rho: | $r_s = \rho_{\text{rg}_X, \text{rg}_Y} = \dfrac{\text{cov}(\text{rg}_X, \text{rg}_Y)}{\sigma_{\text{rg}_X} \sigma_{\text{rg}_Y}}$ | |

FRAMEWORK OF PROACTIVE AND/OR REACTIVE STRATEGIES FOR IMPROVING LABELING CONSISTENCY AND EFFICIENCY

TECHNICAL FIELD

The present invention relates to the electrical, electronic, and computer arts, and more specifically, to machine learning systems, qualitative data analysis systems, and related technologies.

BACKGROUND

Annotation is a process in which one or more humans categorize data by assigning one or more labels to it. In the case that there are multiple annotators, they label the same data set. Annotation is pertinent, for example, in building ground truth for supervised machine learning (ML) classifiers and the basis of qualitative analysis.

Annotation is error-prone because the humans can label the data in inconsistent ways due to fatigue, uncertainty, or difficult-to-categorize data. Furthermore, as annotators familiarize themselves with the labels, their understanding of the labels can change. For example, as someone works on a labeling task, he or she will see more and more examples. As he or she does so, his or her understanding of the boundaries of a label may change, based on the additional information obtained. This may require re-labeling previously-labeled items based on the enhanced understanding.

The errors encountered in labeling typically manifest in two ways: (1) the labeler lacks internal consistency, that is, his or her labels are not consistently applied across one or several annotation sessions, resulting in ill-categorized data and/or (2) the labeler lacks external consistency, that is, his or her labels are not consistent with others working on the same labeling task.

SUMMARY

Embodiments of the present disclosure provide a framework of proactive and reactive strategies for improving labeling consistency and efficiency. According to an embodiment of the present invention, an exemplary method for improving the performance of a computer implementing a machine learning system includes providing, via a graphical user interface, to an annotator, unlabeled corpus data to be labeled; obtaining, via the graphical user interface, labels for the unlabeled corpus data to be labeled; detecting, with a consistency calculation routine, concurrent with the labeling, at least one of internal inconsistency in the labeling and external inconsistency in the labeling; and, responsive to the detection of the at least one of internal inconsistency and external inconsistency, intervening in the labeling with a reactive intervention subsystem until the at least one of internal inconsistency in the labeling and external inconsistency in the labeling is addressed. Further steps include completing the labeling subsequent to the intervening; carrying out training of the machine learning system to provide a trained machine learning system, based on results of the completing of the labeling subsequent to the intervening; and carrying out classifying new data with the trained machine learning system.

According to another embodiment of the present invention, an exemplary method for improving the performance of a computer implementing a machine learning system includes providing, via a graphical user interface, to an annotator, unlabeled corpus data to be labeled; embedding at least one affordance in the graphical user interface to aid the annotator in labeling the unlabeled corpus data to be labeled; obtaining, via the graphical user interface, labels for the unlabeled corpus data to be labeled, the labels being provided while the annotator is aided by the at least one affordance; carrying out training of the machine learning system to provide a trained machine learning system based on the labels provided while the annotator is aided by the at least one affordance; and carrying out classifying new data with the trained machine learning system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

proactive strategies and/or reactive interventions which address the problems of internal and/or external consistency;

support for the annotator during labeling in a proactive and reactive way such that the annotator can complete labeling tasks efficiently and consistently, as opposed to existing tools which tend to focus on the analysis of the labels after the labeling task is complete, supporting the owner of the labeling task instead of the annotators; and enhanced classifier training and performance based on properly and consistently labeled data.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 depicts an affordance including aspects of inter-rater reliability, according to an aspect of the invention;

FIG. 7 depicts an annotation system engaging in reactive interventions, according to an aspect of the invention;

FIG. 8 presents a flowchart of proactive strategy, according to an aspect of the invention;

FIG. 11 depicts a computer system that may be useful in implementing one or more aspects and/or elements of the invention; and FIG. 12 shows alternative measures of inter-annotator agreement, suitable for use in one or more embodiments of the invention.

DETAILED DESCRIPTION

Figure 1:
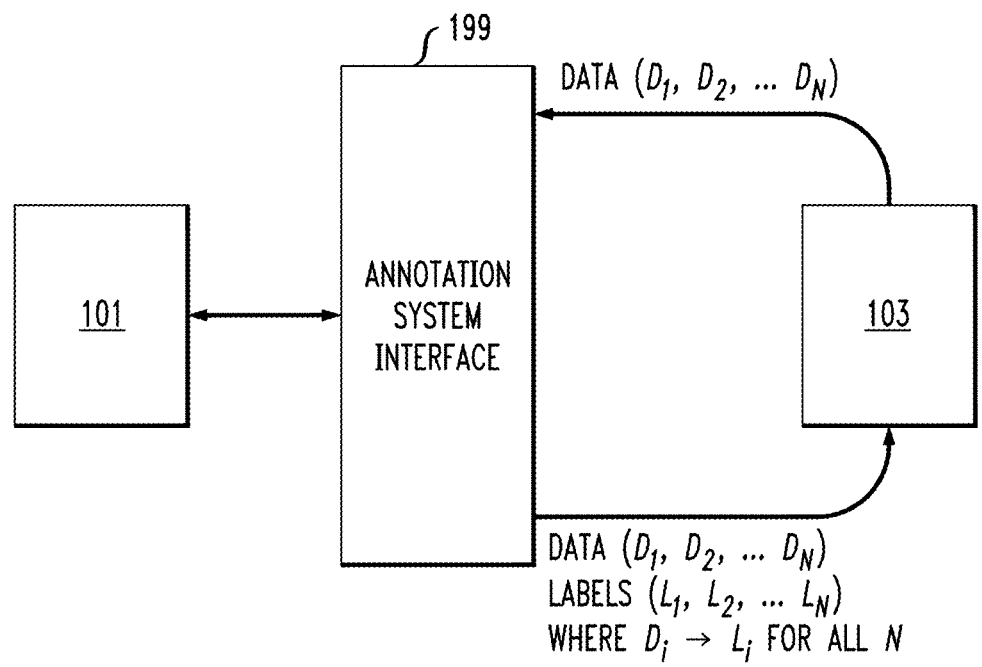
FIG. 1 depicts data annotation in accordance with the prior art.

As noted, and referring now to FIG. 1, annotation is a process in which one or more humans 101 categorize data 103 by assigning one or more labels to it. In the case that there are multiple annotators, they label the same data set. Annotation is pertinent, for example, in building ground truth for supervised machine learning (ML) classifiers and the basis of qualitative analysis. Annotation is error-prone because the humans can label the data in inconsistent ways due to fatigue, uncertainty, or difficult-to-categorize data. Furthermore, as annotators familiarize themselves with the labels, their understanding of the labels can change.

As also noted, this error typically manifests in two ways: (1) the labeler lacks internal consistency, that is, his or her labels are not consistently applied across one or several annotation sessions, resulting in ill-categorized data and/or (2) the labeler lacks external consistency, that is, his or her labels are not consistent with others working on the same labeling task.

One or more embodiments advantageously provide a framework to address the problems of internal and external consistency through a combination of two approaches: proactive strategies and reactive interventions.

Indeed, one or more embodiments provide a system for presenting a human annotator with unlabeled corpus data to obtain labels from the annotator, wherein the system facilitates the annotation task by presenting additional information that the annotator would otherwise need to keep in his or her working memory; providing the annotator with the ability to actively request contextual information about prior annotations; continuously tracking annotation quality and consistency; and/or intervening to steer the annotation task when a drift in annotation consistency is detected. Annotation system interface 199 facilitates interaction between the human annotators 101 and the data 103 that is to be labeled.

Figure 2:
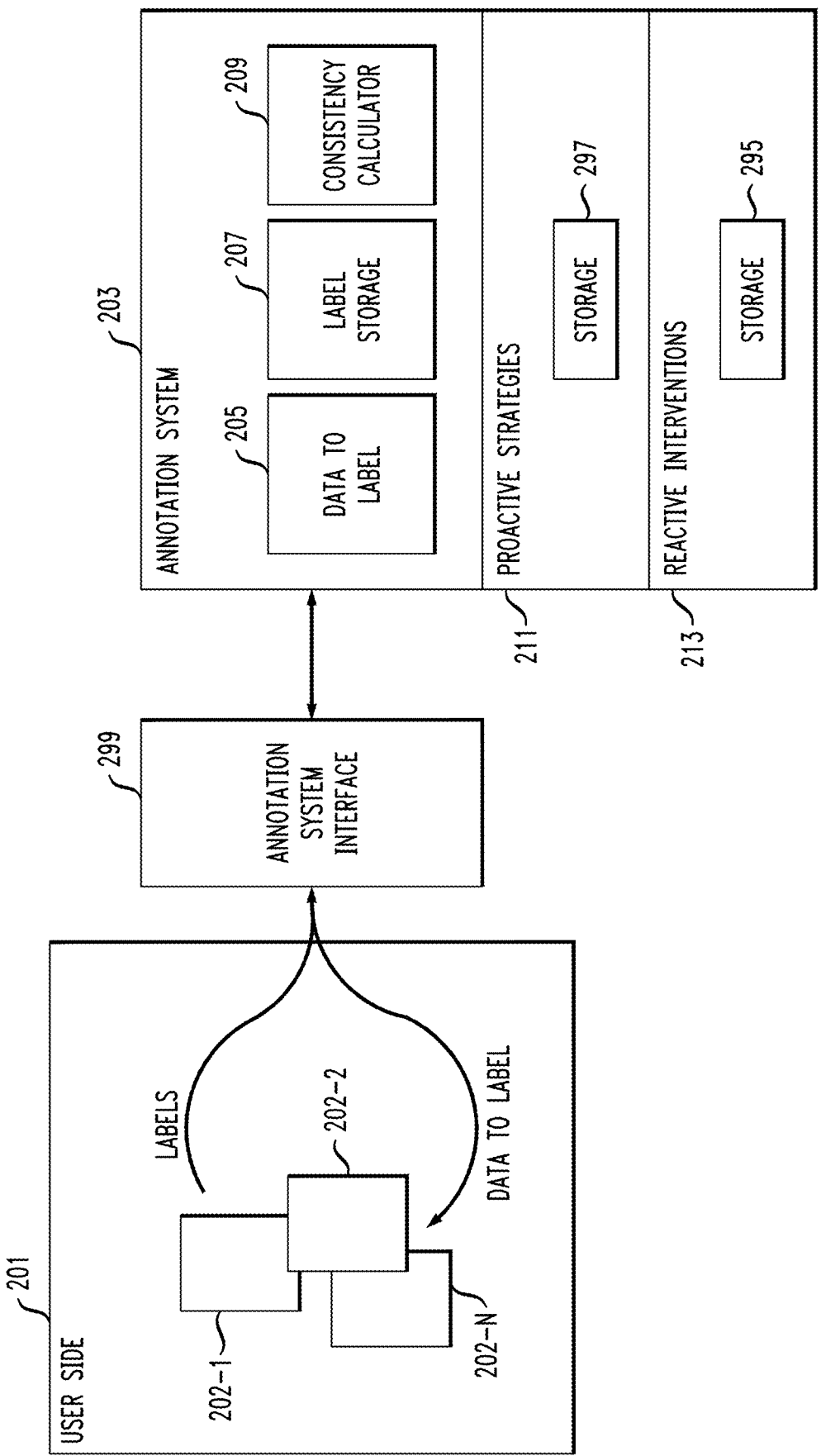
FIG. 2 depicts an annotation system interacting with users, according to an aspect of the invention.

With reference now to FIG. 2, on user side 201, one or more (human) annotators 202-1, 202-2, . . . , 202-N (collectively 202) obtain data to label 205 from annotation system 203, and then label the data via interface 299; the labels are stored in label storage 207. System 203 keeps track of the labels applied by annotators 202-1, 202-2 . . . 202-N and continuously calculates consistency using consistency calculator 209. One or more embodiments add proactive strategies 211 and/or reactive interventions 213 to known systems (see, e.g., discussion of known qualitative coding tools elsewhere herein).

In FIG. 2, annotation system interface 299 can be, for example, a web-based interface; for example, HTML and JavaScript served out by a server into a browser of a client, for the human annotators 202 to interact with. Annotation system 203 can include, for example, databases and code (e.g., written in a suitable high-level language) running on one or more hardware processors of one or more servers (with or without virtualization). Data to label 205 can be stored in a suitable database. Labels stored in label storage 207 can also be stored in a suitable database, which can be the same or different as the database in which data to label 205 is stored. Consistency calculator 209 includes code (e.g., written in a suitable high-level language) running on one or more hardware processors of one or more servers (with or without virtualization), implementing one or more of Jaccard's Index, Cohen's Kappa, Fleiss' Kappa, the Pi statistic, Pearson's r, Kendall's Tau coefficient, Spearman's rho, or the like.

Annotation system 203 can include a main routine which coordinates the subcomponents and provides an interface therebetween. For example, annotation system 203 can be written, e.g., in a high-level language and can retrieve data from and send data to the databases 205, 207 (e.g. using appropriate queries, input/output statements, or the like) as well as making requests of (e.g., calls to) the consistency calculator 209. Annotation system 203 interacts with proactive strategies block 211 and/or reactive interventions block 213 as the case may be. Proactive strategies block 211 and reactive interventions block 213 each has its own main routine as well as a suitable database 297, 295, respectively. The routines (written, e.g., in a suitable high-level language) can implement the logic in FIGS. 9A-9D and 10A-10D, respectively (for example, by calling suitable subroutines corresponding to the particular proactive strategy or reactive intervention being employed). In each case the main routine can access the database 297, 295, as the case may be, using, e.g., appropriate queries, input/output statements, or the like. Furthermore, in each case the main routine can select the proactive strategy or reactive intervention to be used (for example, via a heuristic, pre-configuration, on-line selection algorithm, machine learning, random selection, or the like).

Figure 3:
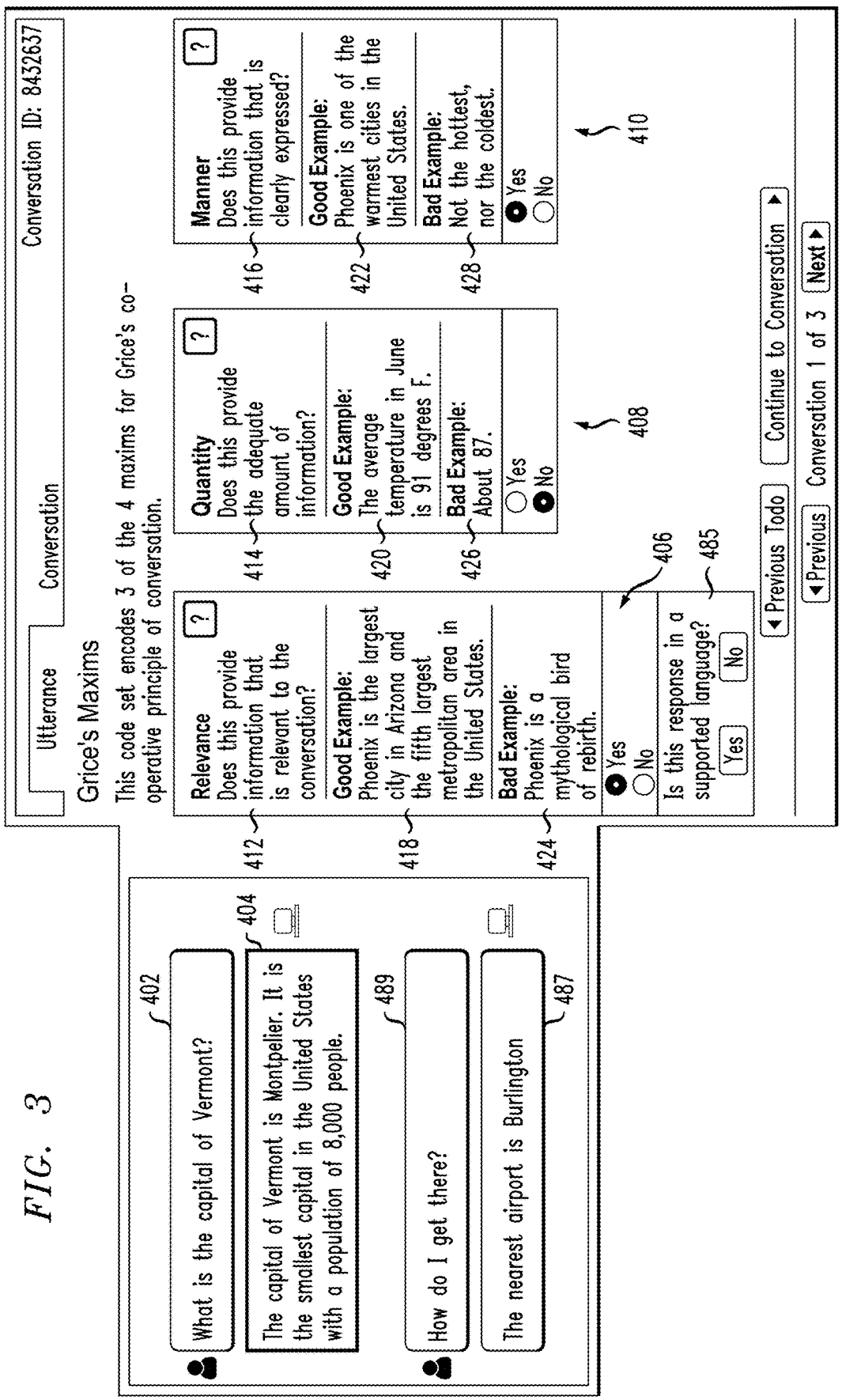
FIGS. 3 and 4 depict proactive strategies in the form of affordances in an annotation environment, according to an aspect of the invention.
Figure 4:
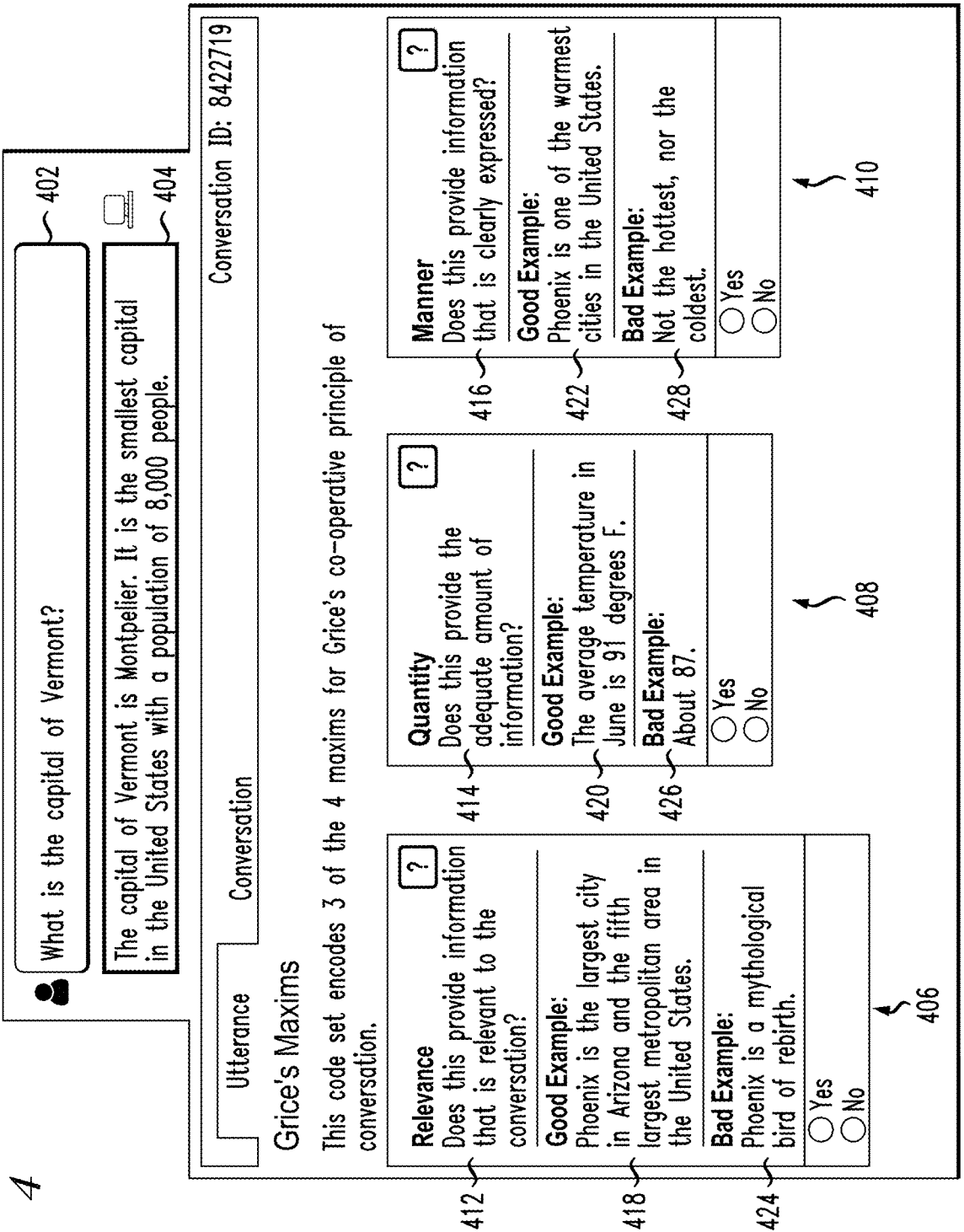

Referring now also to FIGS. 3 and 4, exemplary proactive strategies include changes to the annotation environment that provide affordances and other support to improve annotation consistency and/or efficiency. Affordances added to the environment are preferably flexible and easily adaptable to the domain of interest. In the example of FIGS. 3 and 4, all the text is customizable via configuration files or database entries. As used herein, "affordances" are clues about how an object should be used, typically provided by the object itself or its context. Examples are presented herein wherein the affordances are visual affordances; however, it will be understood that other types of affordances could be used in other embodiments; e.g., synthesized speech or the like.

Regarding affordances in the annotation environment, embedding various affordances in the environment available during labeling enables annotators to be more efficient and consistent, since relevant information is all presented in one place.

In one or more embodiments, providing information about the labels includes:

Definitions: a short description of how the label should be used;

Examples: correctly and incorrectly labeled data provided or mined from prior annotators' labeling history;

Historical examples: presenting an annotator's previously labeled data for a given label;

Filtered examples: presenting an annotator's or a group's previously labeled data for a given label with knobs to change the results selected (e.g., more recent, most-agreed-upon, etc.);

Intelligent examples: leveraging cognitive assistance in selecting previously labeled data. (e.g., most similar to the current data)—for example use machine learning to identify a good example for the particular set of data the annotator is trying to label; and/or Wizards: asking the annotator a series of questions to help him or her select a label for a given piece of data. A labeling task can often be broken down into a set of rules. For example, treating a set of rules as a set of yes-or-no questions, if an annotator is having difficulty labeling a given piece of data, it is possible to walk the annotator through a questionnaire; based on the responses to the questions, the labels can be automatically selected. Note that in FIG. 3 the box 485 querying whether the response is a supported language is an example of a wizard; the other YES/NO questions in FIGS. 3 and 4 are not necessarily wizards per se.

The proactive strategies thus generally involve giving the annotator more information about labels so that he or she can make an intelligent decision about which label(s) apply to a given piece of data.

At 402, note text typed into a virtual agent by a human user. The virtual agent's response is at 404. At 489, note further text typed into a virtual agent by a human user. The virtual agent's further response is at 487. Response 404 is highlighted. Three of Grice's maxims for the co-operative principle of conversation are applied at 406, 408, and 410; namely, relevance 406, quantity 408, and manner 410. For the conversation 402, 404, for each of the three categories 406, 408, 410, the human labeler selects "Yes" or "No." A definition 412, 414, 416 is provided for each category, as well as a "good" example 418, 420, 422 and a "bad" example 424, 426, 428. Note that Grice's Maxims are non-limiting examples of techniques to determine whether the features of a conversation promote further conversation. Furthermore, FIGS. 3 and 4 are non-limiting examples of a labeling task; it is desired to label a conversation with Relevant/Not Relevant; Quantity Good/Quantity Not Good; Manner Good/Manner Not Good. For Relevant/Not Relevant, the affordances include the definition, the good example, the bad example, and the wizard 485. For Quantity Good/Quantity Not Good; Manner Good/Manner Not Good, the affordances include the definition, the good example, and the bad example.

Proactive strategies can include, for example, data ordering strategies. Annotation tasks typically use a uniform, random subsample strategy (with a sample distribution similar to the data it is desired to label) to determine what data to label. If it is desired to ensure efficiency and consistency in the labeling task, this approach may not be ideal. People may find it helpful to learn things in order; for example, to deal with one label and many examples of data appropriately labeled with that label, before moving to the next label. An individual might wish to review easy examples before moving to more difficult examples. In one or more embodiments, the system can intelligently alter order when presenting data for labeling.

Some embodiments order by difficulty: assuming that data can be ordered according to difficulty of the labeling task (e.g., using a confidence statistic as a proxy for difficulty), then one alternate strategy is to order the data from least difficult to most difficult. This allows the user to establish his or her understanding of a label before being presented with data that is harder to label. Alternatively, ordering by most difficult first may help annotators discover boundary cases and improve their understanding of a label.

Some embodiments order by group agreement: in the case of multiple annotators, for cases where others have already labeled data, those labels can be used to dictate the order that data is presented. For example, presenting labels from most-agreed-upon to least-agreed-upon can help an individual annotator understand how the group understands a label and urge the individual annotator towards a shared understanding, and also, help guide him or her regarding how a label should be utilized.

Referring now to FIG. 5, providing information about the annotators can include, for example:

Agreement: surfacing measures of inter-rater agreement during the labeling task;

Others' labels: after an annotator selects a label, revealing how other annotators labeled the same or similar data; and/or Explanations: embedding explanations as to why difficult-to-label data was labeled in a given way and surfacing those explanations among the group.

Thus, one or more embodiments provide feedback to a labeler regarding how well he or she is doing relative to himself or herself, and/or the group. Within the qualitative research community, there is a notion of inter-rater reliability (also known as inter-annotator agreement). Heretofore, these numbers have typically been considered after the labeling task is complete. However, in one or more embodiments, it is desired to get the labelers to a consistent state as quickly as possible, so feedback is provided during the labeling task.

As indicated in FIG. 5, Jaccard's index is a measure of the agreement between two or more coders. It is calculated by dividing codes that coders agree on (intersection) by the total number of codes (union). A value of 80% or better is generally considered to be desirable. In the example of FIG. 5, coders "David P. and "John" have 100.00% agreement in mapping "Grice's Maxims" to "Relevance" while coders "David P. and "Michal" have 84.00% agreement in mapping "Grice's Maxims" to "Relevance." Cohen's kappa measures the agreement between two raters who each classify N items into C mutually exclusive categories. It is defined as $K=(p_o-p_e)/(1-p_e)$, where $p_o$ is the relative observed agreement among raters (identical to accuracy), and $p_e$ is the hypothetical probability of chance agreement, using the observed data to calculate the probabilities of each observer randomly seeing each category. Cohen's kappa can also be used as a measure of inter-rater reliability in one or more embodiments.

Referring now also to FIG. 12, many other measures can also be used; for example:

Fleiss' Kappa is a statistical measure for assessing the reliability of agreement between a fixed number of raters when assigning categorical ratings to a number of items or classifying items, wherein the denominator in FIG. 12 gives the degree of agreement that is attainable above chance, and the numerator gives the degree of agreement actually achieved above chance;

the Pi statistic or Scott's pi is a statistic for measuring inter-rater reliability for nominal data in communication studies. Scott's pi is similar to Cohen's kappa except Pr(e) is calculated using joint proportions;

Pearson's r is a measure of the linear correlation between two variables X and Y, where $\sigma_X$ is the standard deviation of X, $\sigma_Y$ is the standard deviation of Y, E is the expectation, $\mu_X$ is the mean of X, and $\mu_Y$ is the mean of Y;

Kendall's Tau coefficient is a statistic used to measure the ordinal association between two measured quantities. There are $$\binom{n}{2}$$

distinct pairs of observations in the sample, and each pair (barring ties) is either concordant or discordant; and/or Spearman's rho is a nonparametric measure of rank correlation (statistical dependence between the ranking of two variables); it assesses how well the relationship between two variables can be described using a monotonic function. The numerator is the covariance of the rank variables while the denominator is the product of the standard deviations of the rank variables.

It is believed that a comparison of proactive strategies to existing work will be helpful in aiding the skilled artisan to appreciate aspects of the invention. Qualitative coding tools such as Atlas.ti, NVivo, and The Coding Analysis toolkit, all permit attaching codes to data, calculating agreement, and viewing the results. However, aside from attaching comments or memos to codes, there is little to no support for the annotator as he or she is carrying out the annotation task. Instead, these tools focus on attaching codes to data and providing a plurality of ways to understand the results of those annotations. The goal of qualitative coding tools is generally to facilitate analysis of the data rather than to improve the labeling thereof.

Annotation tools and services include crowdsourcing tools such as Amazon's Mechanical Turk, Indico CrowdLabel, and CrowdFlower, which all find annotators for labeling tasks and provide ways to export that data, often with some results-oriented analytics (which are not exposed to the annotator). In contrast to one or more embodiments, these prior-art platforms tend to isolate users and do not reveal any information to an individual annotator regarding how other annotators are doing, nor do they provide support for an annotator to look back at his or her own labels in situ. The goal of these tools is to match people willing to do a task with people who have tasks to be accomplished.

"Aeonium: Visual Analytics to Support Collaborative Qualitative Coding" by Drouhard et al., Pacific Visualization Symposium (PacificVis), 2017 IEEE, has a subset of affordances in proactive strategies; however, in contrast, one or more embodiments of the invention go much further by considering other facets such as data ordering and incorporation of intelligence into the interface (e.g. deciding what examples to present).

Figure 6:
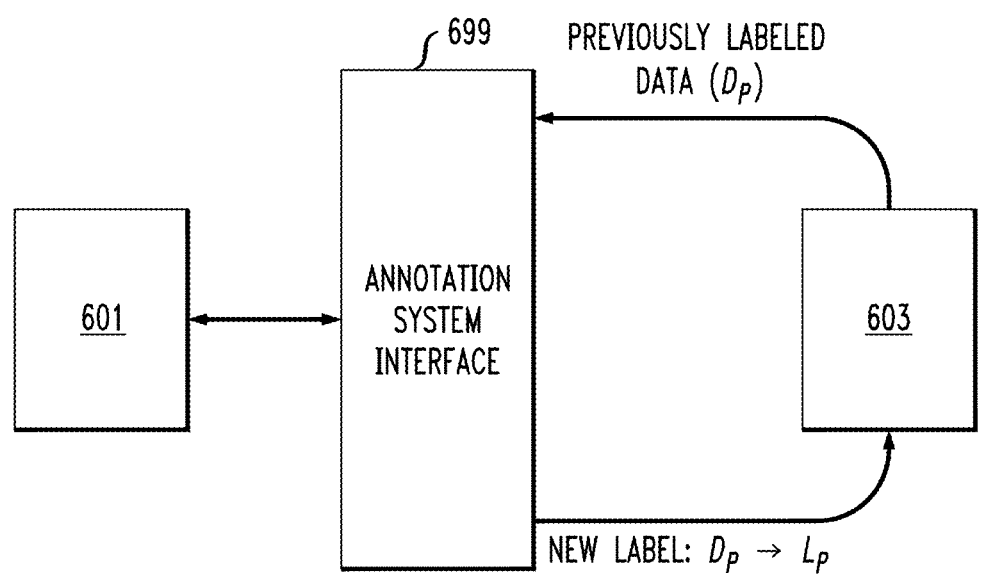
FIG. 6 depicts tracking and measuring consistency, according to an aspect of the invention.

It is worth considering aspects of tracking and measuring consistency. Referring to FIG. 6, to evaluate if an annotator 601 is consistent with himself or herself, in one or more embodiments, the system occasionally retests the annotator 601 by resending data 603 which that annotator has previously labeled, via annotation system interface 699 (which can be similar to block 299 described above). The data to be resent is selected using some sort of selection criterion. Some embodiments employ random selection. A "smart" approach can be used in other embodiments; for example, weighing the random selection towards more recently labeled data; more recently labeled data tends to be more consistent as a labeler or group of labelers converge on labeling consensus. The information is then compared to the previously labeled data to measure whether the annotator's labeling is consistent. Should the measure dip below an established threshold, the proactive strategies used by the system can be altered and/or one or more reactive interventions can be triggered. For the avoidance of doubt, the labeler is re-presented with, in unlabeled form, data he or she has previously labeled and a determination is made whether the re-presented data is labeled consistently with the initial presentation.

A simple example of a measure of consistency is the percentage of labels that have changed during the retesting. In the case of multiple annotators, inter-annotator agreement measures can be used in addition to the retesting strategy; see discussion of Jaccard's Index, Cohen's Kappa, Fleiss' Kappa, the Pi statistic, Pearson's r, Kendall's Tau coefficient, and Spearman's rho elsewhere herein.

Referring now to FIG. 7, consider aspects of reactive interventions 713 in accordance with one or more embodiments. In FIG. 7, elements 701, 702-1, 702-2, 702-N, 703, 705, 707, 709, 711, 713, 797, 795, and 799 are analogous to elements 201, 202-1, 202-2, 202-N, 203, 205, 207, 209, 211, 213, 297, 295, and 299 in FIG. 2 and will not be described again in detail. Interventions occur, for example, when the system detects that an annotator is no longer consistent with himself or herself or others (see bold exclamation point in consistency calculator 709 suggesting detection of inconsistency). These drifts may occur intentionally (when the annotator is first learning what types of data apply to a label) or unintentionally (fatigue).

Interventions interrupt the standard labeling task and instead redirect the annotator's attention in an effort to get him or her back on track. Interventions continue until they are resolved, usually by showing that the annotator is back on track. Thus, in some interventions, an annotator may be required to re-label previous labeled data.

In one or more embodiments, reactive interventions can include providing information to urge annotators to agreement. A difference view is a view to reveal disagreements between annotators. This view can be extended to solicit explanations for labels, which then can be used in future instances to help bring groups into agreement. A label versioning view is a view with explanations to show how and why a label may have changed over time, displayed with the data that prompted the change.

Exemplars for incorrect labels are employed in some instances. For labels that an annotator is having difficulty becoming consistent with, provide a set of examples collected from the annotator's history, or the group's history, which have high agreement for that label.

In a retest and evaluate approach, take a subsample of high-agreement, labeled data that an annotator is having difficulty with. With this data, give the annotator a short (possibly in the form of a game-like interaction—see discussion of "gamification" below) mini-quiz with instant feedback to quickly expose the annotator to where he or she is in disagreement.

Label curation can be initiated by the annotator or automatically detected when a label is consistently different than the rest of the group's consensus, providing a within-tool mechanism to facilitate discussion about the meaning of the label, codifying it and storing it for easy reference later.

In a "gamification" aspect (e.g., give virtual scores, points, rewards, medals, compete with other labelers or groups of labelers, etc.), simply display the annotator's reliability during the course of a task to urge him or her into consistency. In data ordering, like the proactive approach, it is possible to order data to help get the annotator back on track. For example, if someone is struggling, it may be appropriate to give the person several easy examples to get the person back on track (say, by helping the person recall why he or she was previously labeling in a certain manner).

It is believed that a comparison of reactive interventions to existing work will be helpful in aiding the skilled artisan to appreciate aspects of the invention. None of the known qualitative coding tools interrupt annotations; all changes to existing labels occur after the labels have been analyzed. None of the known crowd sourcing tools provides support to interrupt annotators or reveal information about how the annotator is doing relative to himself or herself or others. Reactive interventions for labeling are not believed to be known in the prior art.

It is worth reiterating that one or more embodiments provide support for the annotator during labeling in a proactive and reactive way such that the annotator can complete labeling tasks efficiently and consistently, as opposed to existing tools which tend to focus on the analysis of the labels after the labeling task is complete, supporting the owner of the labeling task instead of the annotators.

In another aspect, human-annotated metrics can be employed in one or more embodiments. For example, for conversational data, a company may want to know what categories of questions are problematic for its classifier. One approach is to use this framework and multiple annotators to assign topics (labels) for each conversation. A potential benefit over an ad-hoc approach is that any analysis of those topics is more meaningful because there is data showing that there is a consensus among those annotators doing the labeling tasks.

Similarly, if there are other human-annotated metrics developed for identifying problems in a conversation, which are also shown to improve the customers' experience in using the conversational system, then this framework can be used to provide additional soundness to any analysis performed on these metrics.

FIG. 8 presents a flow chart describing how data that is previously defined as proactive strategy data, such as label definitions, non-historical examples, and wizards, may be implemented. Depending on the strategies used, proactive strategy data may include things such as the definitions of each category being labeled, examples of how to correctly or incorrectly label per category, and/or predefined flow charts for wizards. In step 802, the user 202-1, 202-3, 202-N requests data to label 205 from the system 203, uses a suitable annotation system interface 299. In step 804, the system 203 requests data to label from the data store 205. In step 806, using block 211, the system 203 retrieves a proactive strategy for the user based on the user's history. Further regarding block 211, one non-limiting example of a proactive strategy includes use of definitions and/or examples. Definitions and/or examples can be stored, for example in a configuration file or database that stores the definitions and/or examples for a given category (designated generally as storage 297). Thus, in a non-limiting example, proactive strategies can be implemented using a database, such as a relational database. For a given proactive affordance, query based on the label it is desired to extract from the user—this is the input to block 211 (the user's past history can also be an input, if the particular affordance requires it—this could be retrieved, for example, from label storage 207). One or more embodiments also utilize suitable logic in block 211 to determine which proactive strategies to employ.

In step 808, the system 203 requests relevant data for the proactive strategy from the label storage 207 and/or storage 297. In step 810, the system 203 sends the collected data back to the annotation system interface 299. In step 812, the interface processes the proactive strategy data and presents it to the user. In step 814, the interface processes the data to label 205 and presents it to the user. In step 816, the user enters the labels. Logical flow then returns to step 802. In FIG. 8, steps 802, 804, 810, 814, and 816 are conventional (see following sentences however) and can be implemented using a known basic labeling tool flow. Steps 806, 808, and 812 represent proactive strategies in accordance with one or more embodiments, as described herein. Note, however, that steps 814 and 816 use the unconventional input provided by steps 806, 808, and 812 and in that sense are not entirely conventional.

Figure 9A:
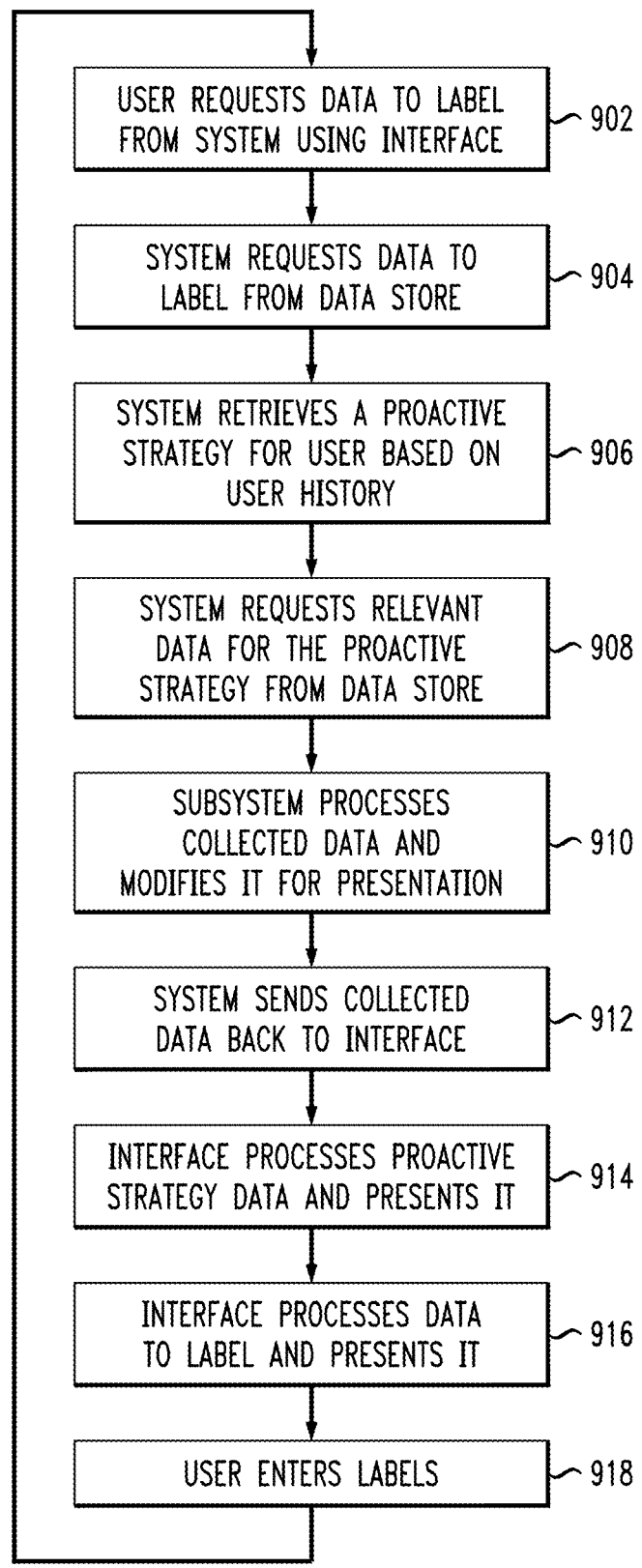
FIGS. 9A-9D, collectively "FIG. 9," present flowcharts including additional processing of data, according to aspects of the invention, FIG. 9A being a generalized flow chart, FIG. 9B being particularized for aspects of definitions as affordances, FIG. 9C being particularized for aspects of examples as affordances, and FIG. 9D being particularized for aspects of wizards as affordances.

FIG. 9A presents a flow chart describing how data that requires some additional processing, such as historical examples, filtered examples, intelligent examples, and the like, may be implemented. This approach also covers data ordering strategies. As before, depending on the strategies used, proactive strategy data may include things such as the annotators' histories, what filters to apply, and/or which intelligent agents to use. In step 902, the user 202-1, 202-3, 202-N requests data to label 205 from the system 203, using a suitable user interface 299. In step 904, the system 203 requests data to label from the data store 205. In step 906, using block 211, the system 203 retrieves a proactive strategy for the user based on the user's history (e.g. from 297). In step 908, the system 203 requests relevant data for the proactive strategy from the data store 205 and/or 297. In step 910, a suitable subsystem (211 with data store 297 and optionally label storage 207 (where history is pertinent) and/or the labeled data of other annotators) processes the collected data and modifies it for presentation. In step 912, the system 203 sends the collected data back to the interface 299. In step 914, the interface processes the proactive strategy data and presents it to the user. In step 916, the interface processes the data to label 205 and presents it to the user. In step 918, the user enters the labels. Logical flow then returns to step 902. In FIG. 9A, steps 902, 904, 912, 916, and 918 are conventional (see following sentences however) and can be implemented using a known basic labeling tool flow. Steps 906, 908, 910, and 914 represent proactive strategies in accordance with one or more embodiments, as described herein. Note, however, that steps 912, 916, and 918 use the unconventional input provided by steps 906, 908, 910, and 914 and in that sense are not entirely conventional.

Figure 9B:
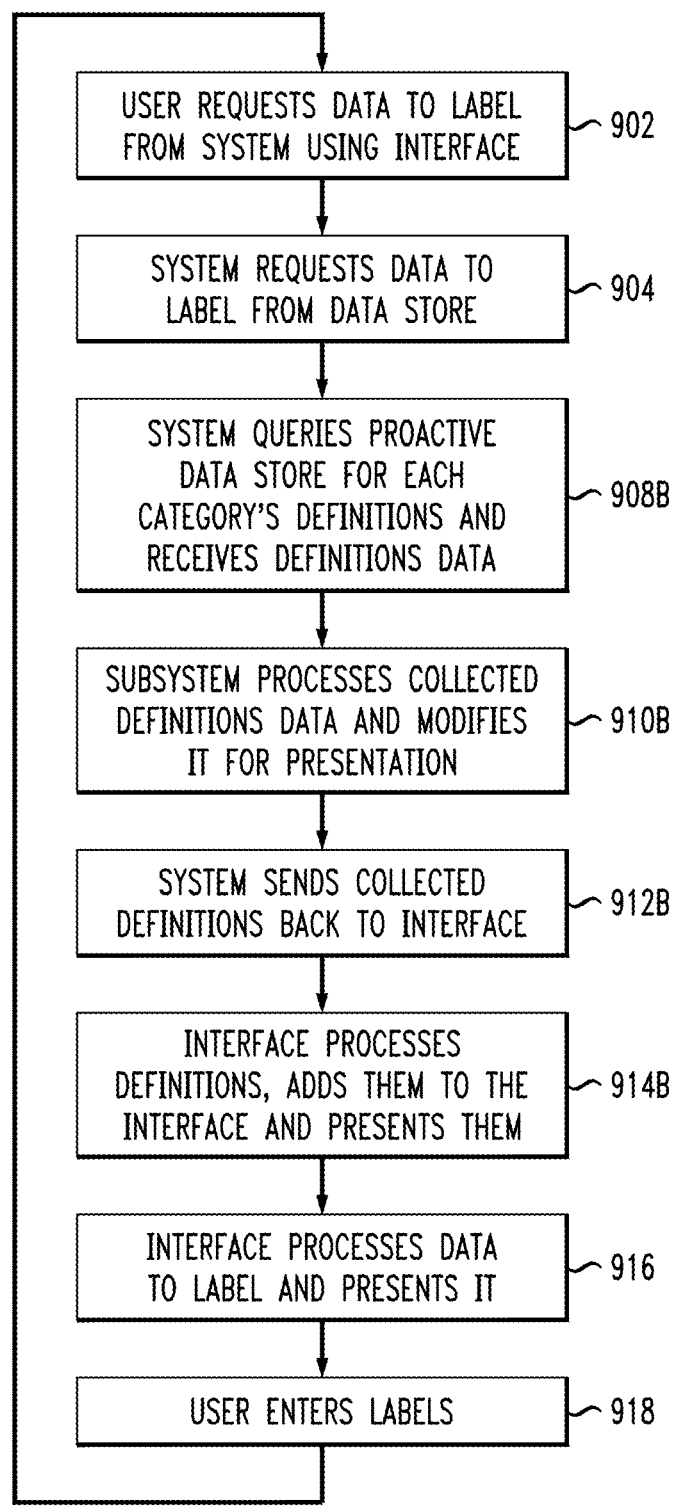

FIG. 9A is a generalized flow chart; FIG. 9B is particularized for aspects of definitions as affordances. Steps 902, 904, 916 and 918 are analogous to FIG. 9A. Step 906 is not present. In step 908B, the system 203 queries the proactive data store 297 for each category's definitions and receives definitions data. In step 910B, a suitable subsystem (211 with data store 297 and optionally label storage 207 (where history is pertinent) and/or the labeled data of other annotators) processes the collected definitions data and modifies it for presentation. In step 912B, the system 203 sends the collected definitions back to the interface 299. In step 914B, the interface processes the definitions, adds them to the interface, and presents them. A sample query, in pseudo code, could be: 908B: SELECT ALL definition FROM proactive_store.definitions WHERE category IN (category1, category2, . . . ).

Figure 9C:
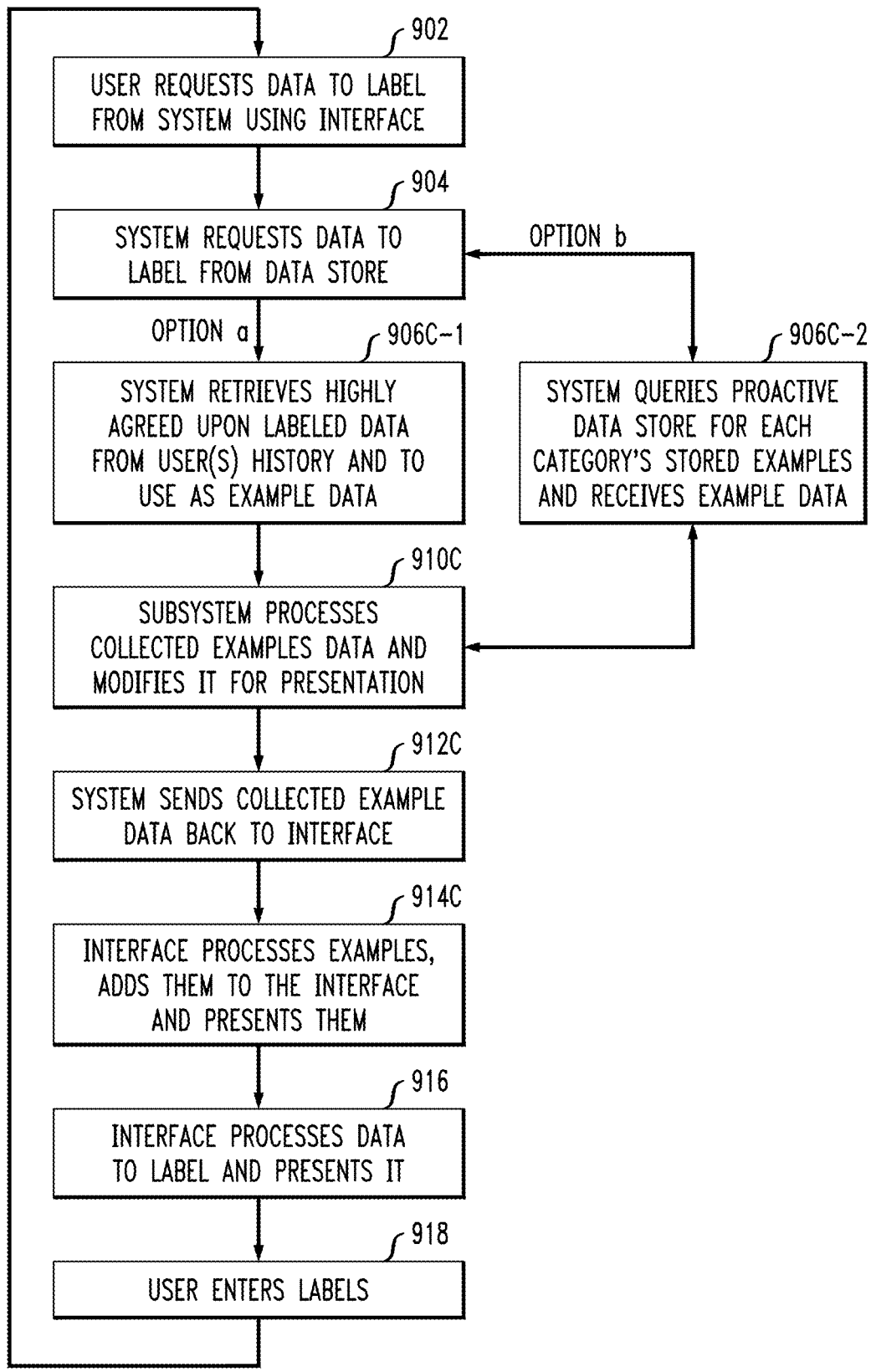

FIG. 9C is particularized for aspects of examples as affordances. Steps 902, 904, 916 and 918 are analogous to FIG. 9A. In a first option ("Option a"), as per step 906C-1, the system retrieves highly agreed upon labeled data from the user(s) history and to use as example data, while in a second option ("Option b"), as per step 906C-2, the system queries the proactive data store for each category's stored examples and receives example data. In each case, logical control next passes to step 910C, wherein the subsystem processes collected examples data and modifies it for presentation. In step 912C, the system sends collected example data back to the interface. In step 914C, the interface processes examples, adds them to the interface and presents them. Note that for intelligent examples, both Option a and b occur and the data is combined in 910C. A sample query in pseudo code could be, for example:

906C-1: SELECT ALL text FROM system_store.labels WHERE conversation_id=<id to label> AND agreement><agreement threshold>

906C-2: SELECT ALL example FROM proactive_store-.examples WHERE category IN (category1, category2, . . . ).

Figure 9D:
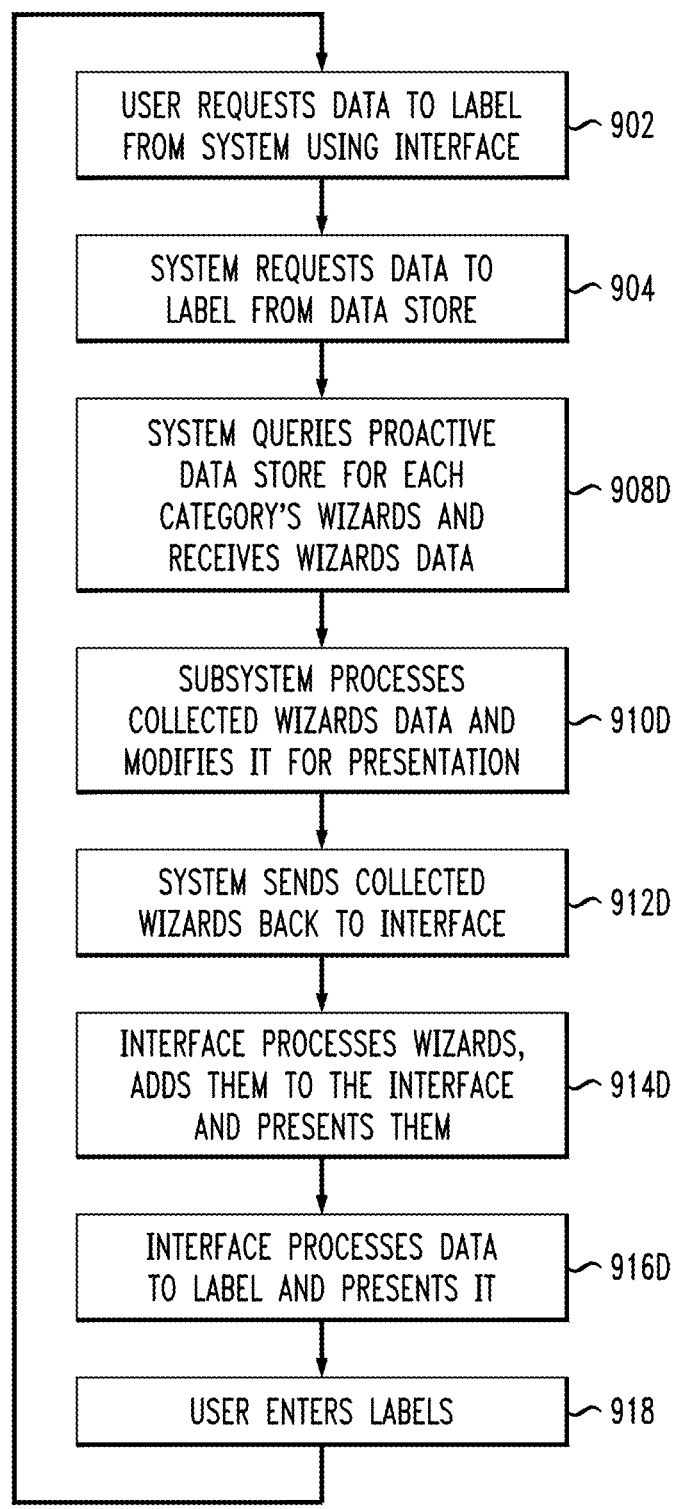

FIG. 9D is particularized for aspects of wizards as affordances. Steps 902, 904, 916 and 918 are analogous to FIG. 9A. Step 906 is not present. In step 908D, the system queries the proactive data store for each category's wizards and receives wizards data. In step 910D, the subsystem processes collected wizards data and modifies it. In step 912D, the system sends collected wizards back to the interface. In step 914D, the interface processes wizards, adds them to the interface and presents them. A sample query in pseudo code could be, for example: 908D: SELECT ALL wizard_data FROM proactive_store.wizards WHERE category IN (category1, category2, . . . ).

Figure 10A:
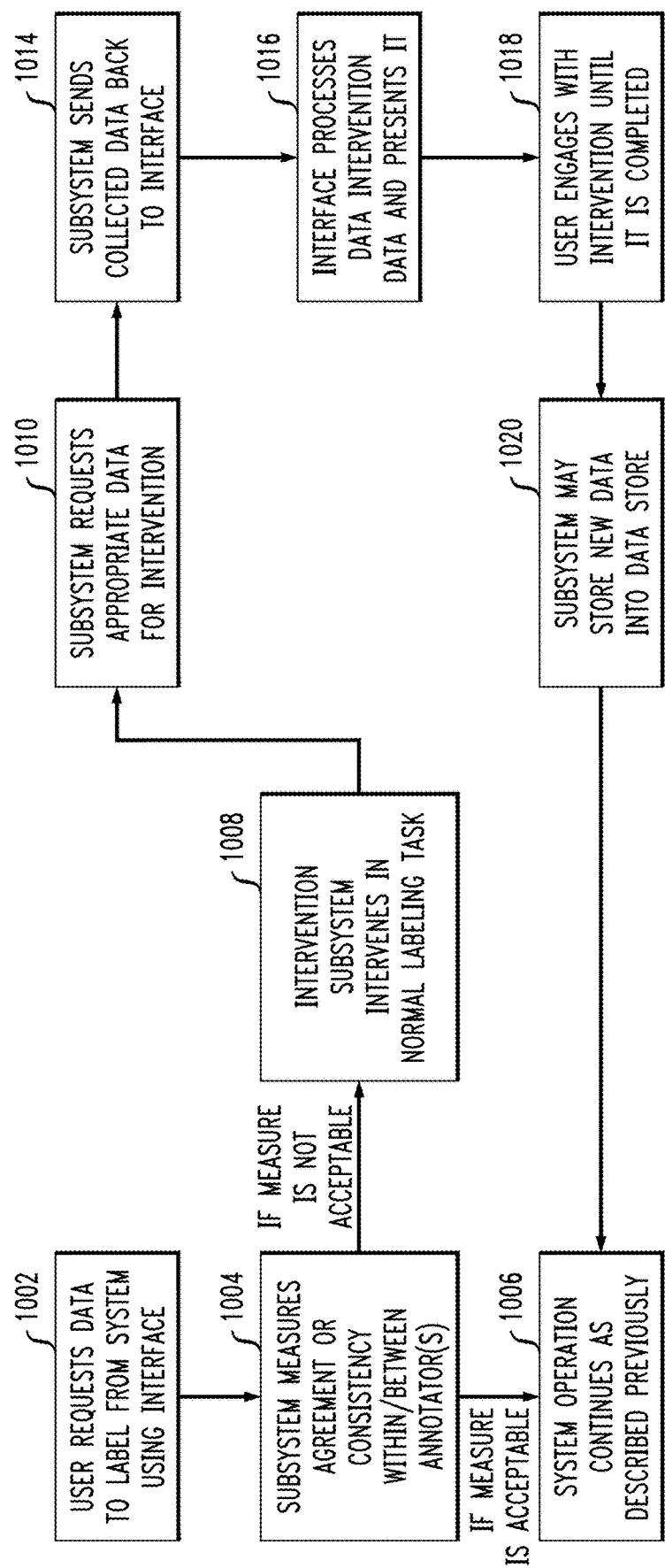
FIGS. 10A-10D, collectively "FIG. 10," present flowcharts showing how interventions can be implemented, according to aspects of the invention, FIG. 10A being a generalized flow chart, FIG. 10B being particularized for aspects of exemplars as intervention, FIG. 10C being particularized for aspects of curation as intervention, and FIG. 10D being particularized for aspects of a difference view as intervention.

FIG. 10A presents a flow chart describing how interventions may be implemented. In one or more embodiments, while the types of interventions may differ, similar techniques can be used for determining when to intervene. In step 1002, the user 702-1, 702-3, 702-N requests data to label 705 from the system 703, using a suitable annotation system interface 799. In step 1004, a suitable subsystem 709 measures agreement or consistency within/between annotator(s). If this measure is acceptable, system operation continues normally, in step 1006. Please note that step 1004 is, in essence, a decision block, but is depicted as a process rectangle for illustrative convenience. On the other hand, if the consistency measure is not acceptable, logical flow proceeds to step 1008, wherein intervention subsystem 713 intervenes in the normal labeling task. In step 1010, the subsystem 713 requests appropriate data for the intervention. In step 1014, the subsystem 713 sends the collected data back to the interface. In step 1016, the interface processes the intervention data and presents it to the user. In step 1018, the user engages with the intervention subsystem 713 until the intervention is completed. In step 1020, subsystem 713 optionally stores new data into a suitable data store such as, for example, data storage 707 (for example where one or more interventions collected new labels). In another aspect, the end user can be solicited for the reasons as to why he or she labeled things the way he or she did—for example, store in storage 795 within the reactive interventions block 713. Logical flow then proceeds to step 1006 wherein the system operates normally.

Figure 10B:
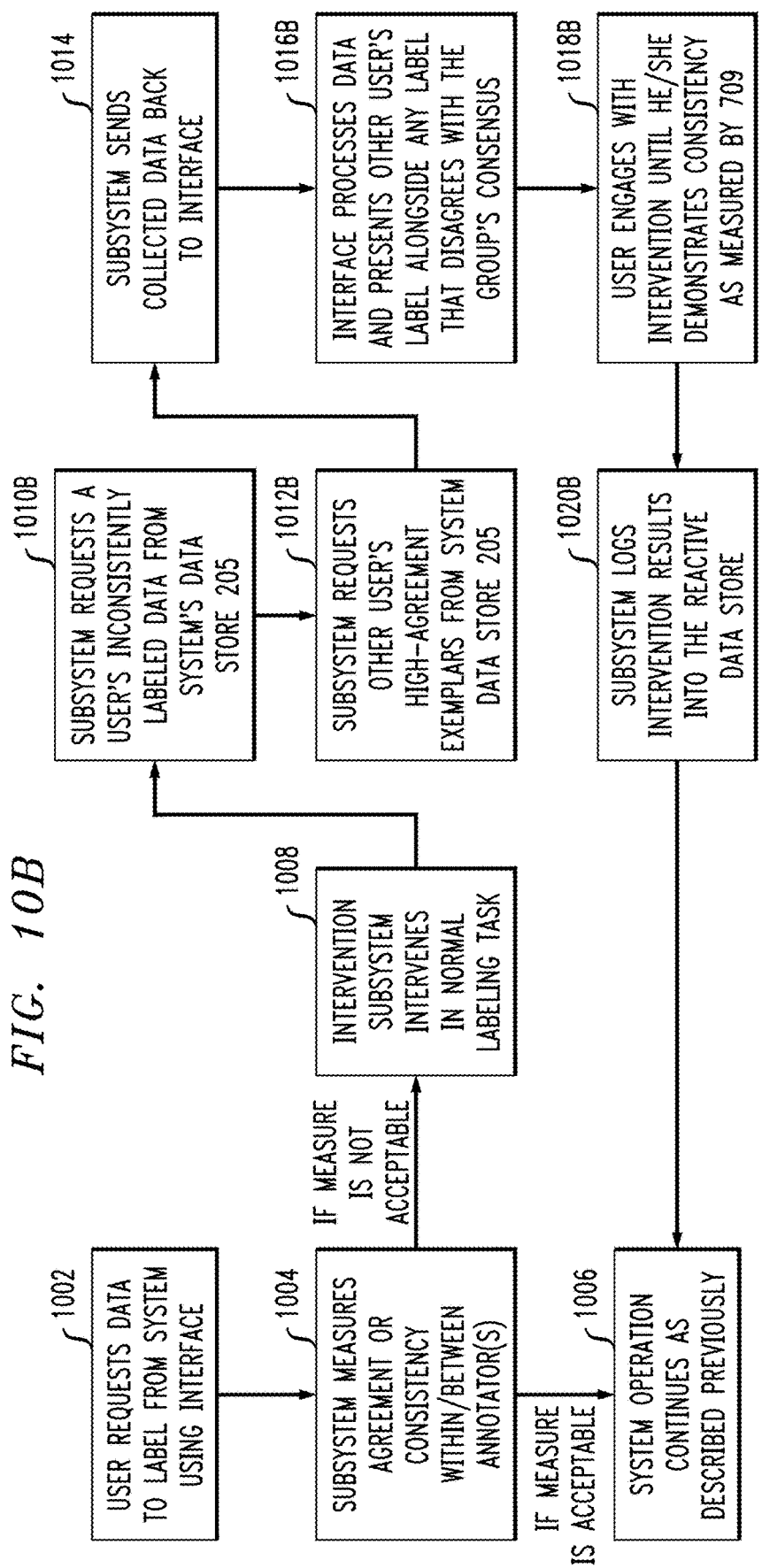

FIG. 10A is a generalized flow chart, while FIG. 10B is particularized for aspects of exemplars as intervention. Steps 1002, 1004, 1006, 1008 and 1014 are analogous to FIG. 10A. In step 1010B, the subsystem 713 requests a user's inconsistently labeled data from the system's data store 705. In step 1012B, the subsystem requests other user's high-agreement exemplars from system data store 705. In step 1016B, the interface processes the data and presents other user's labels alongside any label that disagrees with the group's consensus. In step 1018B, the user engages with the intervention until he or she demonstrates consistency as measured by 709. In step 1020B, the subsystem logs intervention results into the reactive data store.

Figure 10C:
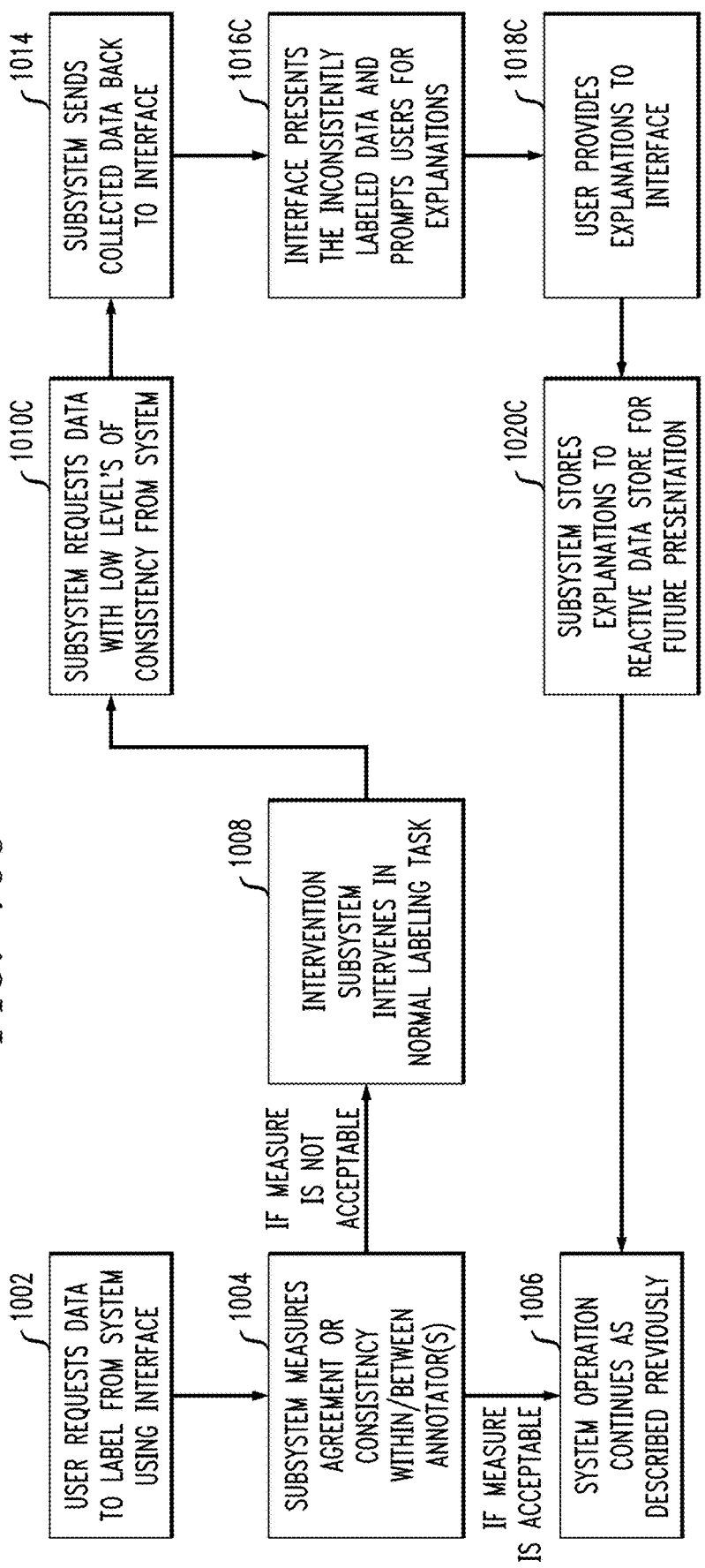

FIG. 10C is particularized for aspects of curation as intervention. Steps 1002, 1004, 1006, 1008 and 1014 are analogous to FIG. 10A. In step 1010C, the subsystem 713 requests data with low levels of consistency from the system. In step 1016C, the interface presents the inconsistently labeled data and prompts users for explanations. In step 1018C, the user provides explanations to the interface. In step 1020C, the subsystem stores explanations to the reactive data store 795 for future presentation.

Figure 10D:
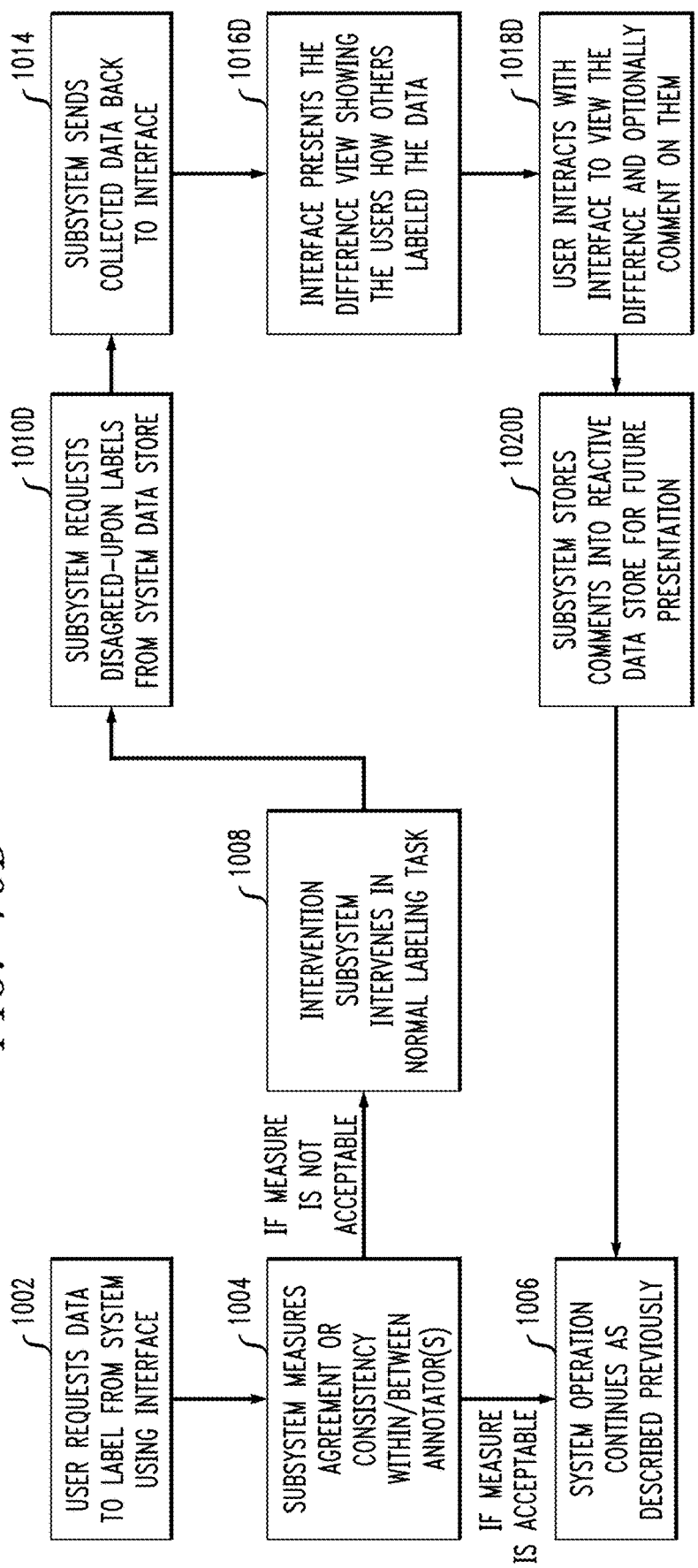

FIG. 10D is particularized for aspects of a difference view as intervention. Steps 1002, 1004, 1006, 1008 and 1014 are analogous to FIG. 10A. In step 1010C, the subsystem 713 requests disagreed-upon labels from the system data store. In step 1016C, the interface presents the difference view showing the users how others labeled the data. In step 1018C, the user interacts with interface to view the difference and optionally comment on them. In step 1020C, the subsystem stores comments into reactive data store for future presentation.

One or more embodiments advantageously provide labelers with automated proactive interventions when consistency drifts. One or more embodiments facilitate human annotations of a corpus. One or more embodiments provide an interactive guide embodied in a labeling tool with proactive and re-active interventions to guide the labeler.

As will be appreciated by the skilled artisan based on the disclosure herein, one or more embodiments advantageously do not need to rely on an expert's ground truth. One or more embodiments facilitate labelers in finding consistency within themselves and/or within a group without the need for expert input. One or more embodiments shape behavior to increase consistency between and/or within labelers.

Recapitulation

Given the discussion thus far, and referring generally to FIG. 10, it will be appreciated that, in general terms, an exemplary method for improving the performance of a computer implementing a machine learning system, according to an aspect of the invention, includes providing, via a graphical user interface 799, to an annotator 702, unlabeled corpus data to be labeled 705. The method further includes obtaining, via the graphical user interface 799, labels for the unlabeled corpus data to be labeled. A further step includes detecting, with a consistency calculation routine 709, concurrent with the labeling (e.g., while the annotator is carrying out the labeling), at least one of internal inconsistency in the labeling and external inconsistency in the labeling. The latter can be detected, e.g., as described with regard to FIGS. 5 and 12, while the former was discussed with regard to FIG. 6. In one or more embodiments, responsive to the detection of the at least one of internal inconsistency and external inconsistency, intervene in the labeling with a reactive intervention subsystem 713 until the at least one of internal inconsistency in the labeling and external inconsistency in the labeling is addressed. Complete the labeling subsequent to the intervening; carry out training of the machine learning system to provide a trained machine learning system, based on results of the completing of the labeling subsequent to the intervening; and carry out classification of new data with the trained supervised machine learning system.

The skilled artisan is familiar with test and training corpora for machine learning systems and given the teachings herein, can improve the functioning of a computer implementing a machine learning system by training it with more accurately labeled data. For example, one or more embodiments facilitate machine learning including training and test corpuses. A human annotator labels a portion of the data in an initial corpus using one or more techniques of the invention to create a training corpus and this is fed into a machine learning process to train it. A portion of the initial corpus can be withheld to use as a test corpus to determine how well the machine learning process is functioning after the training on the training corpus.

In another aspect, a method omits the last two steps (training and classifying) which are carried out by another operator and/or system on the labeled data.

One or more embodiments thus solve a problem unique to computers and/or improve the functioning of a computer for actual annotation processes and subsequent use of annotated corpora. One or more embodiments are superior to majority voting schemes and reduce or eliminate propagation of data consistency errors.

Embodiments are not limited to machine learning; for example, enhanced labeling for Qualitative Data Analysis (QDA) can also be carried out. A non-limiting example of a machine learning system is a supervised machine learning classifier. Embodiments could also be used, for example, to assist in the grading of essay questions.

In some cases, the inconsistency includes at least external inconsistency; and the intervening includes providing a difference view via the graphical user interface. The difference view reveals labeling disagreements between the annotator and at least one additional annotator. See discussion of FIG. 10D.

In some cases, the intervening includes providing a label versioning view via the graphical user interface. The label versioning view explains how and why a label has changed over time, displayed with data that prompted the change.

In some cases, the intervening includes providing exemplars for at least one incorrect label via the graphical user interface. The exemplars include historical examples that have high agreement for the at least one incorrect label. See FIG. 10B.

In some cases, the intervening includes retest and evaluation. The retest and evaluation includes administering to the annotator, via the graphical user interface, a quiz with instant feedback, based on high-agreement labeled data (i.e., data that most annotators can likely successfully label correctly but that this person is not dealing with successfully) which is causing difficulty for the annotator.

In one or more embodiments, the inconsistency includes at least the external inconsistency; and the intervening includes label curation via the graphical user interface, to facilitate discussion about meaning of a given label with at least one additional annotator. See FIG. 10C.

In one or more embodiments, the inconsistency includes at least the external inconsistency; and the intervening includes re-ordering the unlabeled corpus data to be labeled by at least one of difficulty and group agreement.

In one or more embodiments, the inconsistency includes at least the external inconsistency; and the detecting of the internal consistency includes periodically retesting the annotator on a portion of previously-labeled data using at least one predefined selection criterion as discussed herein.

In some cases, the inconsistency includes at least the external inconsistency; and the detecting of the external consistency includes measuring inter-annotator consistency in real time. Refer, e.g., to FIGS. 5 and 12.

Some embodiments carry out both reactive interventions and proactive affordances; thus, in some cases, the method further includes embedding at least one affordance in the graphical user interface to aid the annotator in labeling the unlabeled corpus data to be labeled.

Furthermore, given the discussion thus far, and referring generally to FIG. 9, it will be appreciated that, in general terms, another exemplary method for improving the performance of a computer implementing a machine learning system, according to another aspect of the invention, includes providing, via a graphical user interface 299, to an annotator 202, unlabeled corpus data 205 to be labeled. A further step includes embedding at least one affordance in the graphical user interface to aid the annotator in labeling the unlabeled corpus data to be labeled. For example, see affordances in FIGS. 3 and 4 as well as storage 297. A further step includes obtaining, via the graphical user interface, labels for the unlabeled corpus data to be labeled. The labels are provided while the annotator is aided by the at least one affordance. A still further step includes carrying out training of the machine learning system to provide a trained machine learning system based on the labels provided while the annotator is aided by the at least one affordance. An even further step includes carrying out classifying new data with the trained machine learning system.

In some cases, in the embedding step, the at least one affordance includes a definition 412, 414, 416 and example 418, 420, 422 for each label. See FIGS. 9B and 9C.

In some cases, in the embedding step, the at least one affordance includes a wizard routine 485 which queries the annotator with a series of questions, via the graphical user interface, to assist the annotator in label selection. See FIG. 9D.

In some cases, in the embedding step, the at least one affordance includes a re-ordering of the unlabeled corpus data to be labeled by at least one of difficulty and group agreement.

In some cases, in the embedding step, the at least one affordance includes providing data related to how at least one additional annotator has carried out labeling.

In another aspect, a method omits the last two steps (training and classifying) which are carried out by another operator and/or system on the labeled data.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, modules and/or sub-modules to implement the annotation system interface 299, 799; the annotation system 203, 703; the proactive strategy subsystem 211, 711; and/or the reactive intervention subsystem 213, 713. The method steps can then be carried out using the distinct software modules and/or sub-modules of the system, as described above, executing on one or more hardware processors 1102. The modules and/or submodules implement the logic described herein. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving performance of a computer implementing a machine learning system, said method comprising:

providing, via a graphical user interface, to an annotator, unlabeled corpus data;

obtaining, via said graphical user interface, labels for said unlabeled corpus data;

detecting, with a consistency calculation routine, concurrent with said obtaining of said labels, at least internal inconsistency in said labels based on a comparison of an inconsistency measurement in relation to a given threshold, said detecting including periodically retesting said annotator on a portion of data previously-labeled by said annotator, the periodic retesting comprising re-presenting in unlabeled form via said graphical user interface said portion of data that was previously-labeled by said annotator and, in response, receiving a new label from the annotator, the inconsistency measurement being based on a determination of whether said new label is consistent with an initial label provided previously by the annotator to respond to an initial presentation of said portion of data;

responsive to said detection of said internal inconsistency, intervening in said obtaining of said labels, concurrent with said obtaining with said labels, with a reactive intervention subsystem until said internal inconsistency in said labels is addressed;

completing said obtaining of said labels subsequent to said intervening;

carrying out training of said machine learning system to provide a trained machine learning system, based on results of said completing of said obtaining of said labels subsequent to said intervening; and carrying out classifying new data with said trained machine learning system.

2. The method of claim 1, further comprising detecting external inconsistency, wherein said intervening further comprises providing a difference view via said graphical user interface, said difference view revealing labeling disagreements between said annotator and at least one additional annotator.

3. The method of claim 1, wherein:
said intervening comprises providing a label versioning view via said graphical user interface, said label versioning view explaining how and why a label has changed over time, displayed with data that prompted the change.

4. The method of claim 1, wherein:
said intervening comprises providing exemplars for at least one incorrect label via said graphical user interface, said exemplars comprising historical examples that have agreement corresponding to said at least one incorrect label.

5. The method of claim 1, wherein:
said intervening comprises retest and evaluation, said retest and evaluation comprising administering to said annotator, via said graphical user interface, a quiz with instant feedback, based on agreement labeled data.

6. The method of claim 1, further comprising detecting external inconsistency, wherein said intervening comprises label curation via said graphical user interface, to facilitate discussion about meaning of a given label with at least one additional annotator.

7. The method of claim 1, further comprising detecting external inconsistency, wherein said intervening comprises re-ordering, using a confidence statistic, said unlabeled corpus data.

8. The method of claim 1, further comprising detecting external inconsistency, wherein said detecting of said external consistency comprises measuring inter-annotator consistency in real time.

9. The method of claim 1,
further comprising:
constructing a specific wizard routine by:
querying a proactive data store containing a plurality of wizards to retrieve a subset of the wizards associated with a plurality of categories with which the unlabeled corpus data is to be labeled; and
collecting the plurality of retrieved wizards into the specific wizard routine;
embedding at least one affordance in said graphical user interface, the at least one affordance comprising the specific wizard routine, the specific wizard routine being configured to query said annotator with a series of questions, via said graphical user interface, simultaneously with a display of an input control element for receiving a first label of the labels; and
running the specific wizard routine to query the annotator with the series of questions, via said graphical user interface, simultaneously with the display of the input control element for receiving the first label of the labels.

10. A computer implementing a machine learning system, said computer comprising:
a memory;
and at least one processor, coupled to said memory, and operative to:
provide, via a graphical user interface, to an annotator, unlabeled corpus data to be labeled;
obtain, via said graphical user interface, labels for said unlabeled corpus data to be labeled;
detect, with a consistency calculation routine, concurrent with said obtaining of said labels, at least internal inconsistency in said labels based on a comparison of an inconsistency measurement in relation to a given threshold, said detecting including periodically retesting said annotator on a portion of data previously-labeled by said annotator, the periodic retesting comprising re-presenting in unlabeled form via said graphical user interface said portion of data that was previously-labeled by said annotator and, in response, receiving a new label from the annotator, the inconsistency measurement being based on a determination of whether said new label is consistent with an initial label provided previously by the annotator to respond to an initial presentation of said portion of data;
responsive to said detection of said internal inconsistency, intervene in said obtaining of said labels, concurrent with said obtaining of said labels, with a reactive intervention subsystem until said internal inconsistency in said labels is addressed;
complete said obtaining of said labels subsequent to said intervening;
carry out training of said machine learning system to provide a trained machine learning system, based on results of said completing of said obtaining of said labels subsequent to said intervening; and
carry out classifying new data with said trained machine learning system.

11. The system of claim 10, wherein:
said intervening comprises providing exemplars for at least one incorrect label via said graphical user interface, said exemplars comprising historical examples that have agreement corresponding to said at least one incorrect label.

12. The system of claim 10, further comprising detecting external inconsistency, wherein said detecting of said external consistency comprises measuring inter-annotator consistency in real time.

13. The system of claim 10, wherein said at least one processor is further operative to:
construct a specific wizard routine by:
querying a proactive data store containing a plurality of wizards to retrieve a subset of the wizards associated with a plurality of categories with which the unlabeled corpus data is to be labeled; and
collecting the plurality of retrieved wizards into the specific wizard routine; and
embed at least one affordance in said graphical user interface, the at least one affordance comprising the specific wizard routine, the specific wizard routine being configured to query said annotator with a series of questions, via said graphical user interface, simultaneously with a display of an input control element for receiving a first label of the labels; and
run the specific wizard routine to query the annotator with the series of questions, via said graphical user interface, simultaneously with the display of the input control element for receiving the first label of the labels.

* * * * *